Oct. 14, 1924.
J. F. JOY
CONVEYER
Filed Jan. 24, 1924
1,511,221
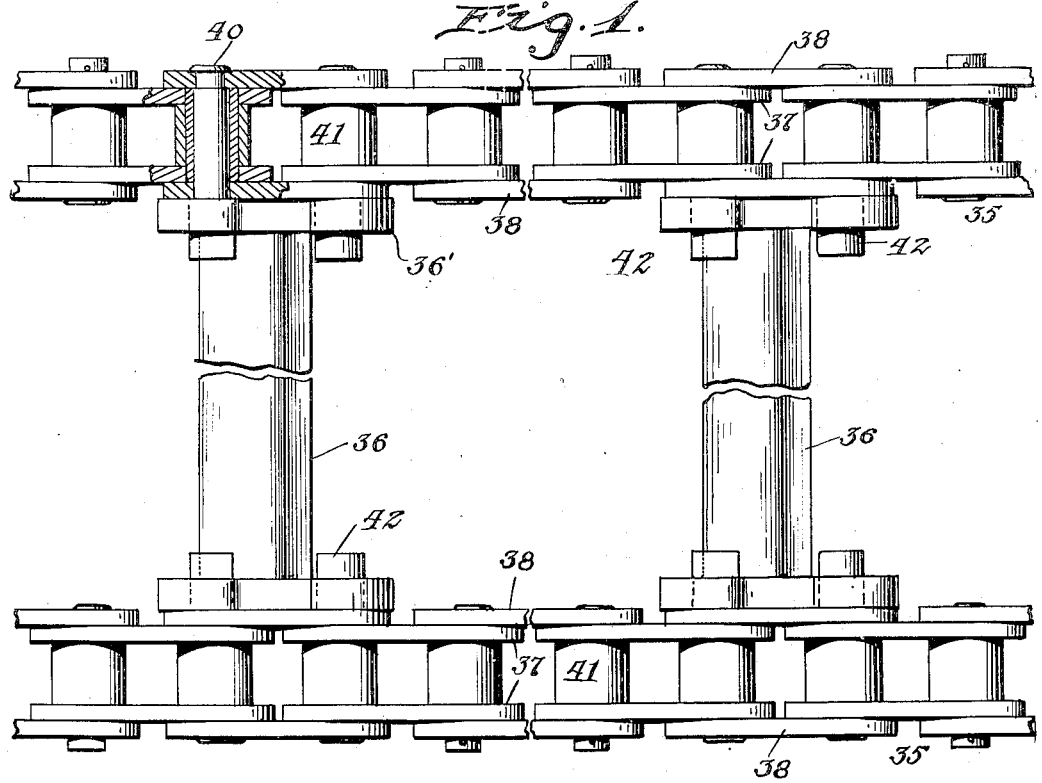
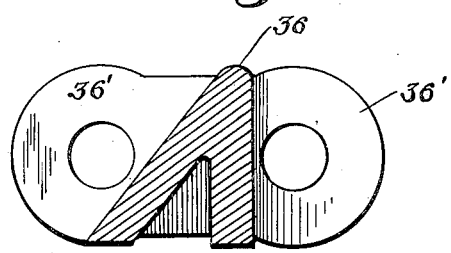
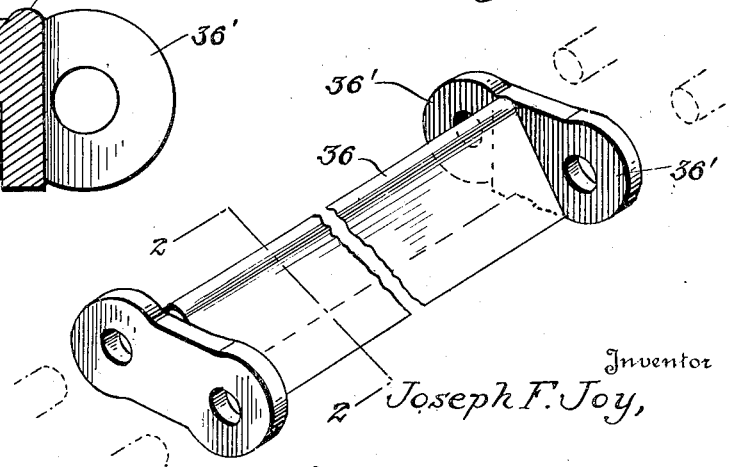
Inventor
Joseph F. Joy,
By J. Stanley Burch.
Attorney Patented Oct. 14, 1924.

1,511,221

UNITED STATES PATENT OFFICE.

JOSEPH F. JOY, OF FRANKLIN, PENNSYLVANIA, ASSIGNOR TO JOY MACHINE COMPANY, OF PITTSBURGH, PENNSYLVANIA, A CORPORATION OF DELAWARE.

CONVEYER.

Application filed January 24, 1924. Serial No. 688,183.

*To all whom it may concern:*

Be it known that JOSEPH F. JOY, a citizen of the United States, residing at Franklin, in the county of Venango and State of Pennsylvania, has invented certain new and useful Improvements in Conveyers, of which the following is a specification.

This invention relates to certain new and useful improvements in conveyers of the well known chain and scraper type and is particularly designed for use in loading machines such as disclosed in my United States Patent 1,306,064, dated June 10, 1919, although adaptable for general application.

One of the greatest troubles with conveyers in machines of the above kind has been due to the flights or scrapers bars getting tangled up in the underside of the endless conveyer member or that part of the same which is known as the return flight of the conveyer. One of the principal objects of the invention is therefore to provide means for attaching the conveyer scraper bars to the chains in such a manner as to permit the scraper bars to entirely detach themselves in the event that either end of a scraper bar should become loosened or the bar become bent.

Another object of the present invention is to provide an endless conveyer member, including the usual spaced parallel pair of endless chains connected at intervals by transverse scraper bars, with improved means for detachably connecting the scraper bars to the chains.

A further object of the invention is to provide an extremely durable but simple form of scraper bar together with simple and durable means for connecting the ends of the same to the endless chains.

Another object of this invention is to provide means to prevent the parallel pair of endless chains used in a chain and scraper type of conveyer being caused to run out of alignment on the driving sprockets through the bending of the scraper flights and thereby shortening the distance between the parallel chains.

Further objects will become apparent as the nature of the invention is better understood and the same consists in the novel construction, combination and arrangement of parts hereinafter more fully described, illustrated in the accompanying drawings, and pointed out in the appended claims.

In the drawings forming a part of this application and in which like designating characters refer to corresponding parts throughout the several views, Figure 1 is a fragmentary view partly in plan and partly in section illustrating a portion of a conveyer constructed in accordance with the present invention.

Figure 2 is a sectional view of one scraper bar and

Figure 3 is a perspective view of one of the scraper bars, partly broken away.

Referring more in detail to the several views, it will be understood that the present improvement relates to the construction of the endless conveyer member in my above mentioned patent comprising broadly the chains —35— connected by transverse scraper bars —36—, the chains —35— broadly each comprising pairs of inner links —37— and outer links —38— pivotally connected by pins —40— and spaced by rollers —41—.

In accordance with the present invention the scraper bars —36— are of substantially inverted V-shape in cross section with one leg vertical and the other longer and inclined. The ends of the scraper bars are formed with pairs of oppositely extending ears —36'— adapted for slidable reception upon the inwardly extending enlarged heads —42— provided on certain ones of the pivot pins —40—. The scraper bar ears are preferably constructed of greater thickness than the links —37— and —38—, thereby being more durable for withstanding wear and tear upon the same due to the scraper bars —36— being carried thereby. It will thus be seen that the ends of each scraper bar —36— may be slid onto pairs of the studs or heads —42— so that they are held from rotation.

It will be understood that the chains —35— are of the usual construction with the exception of the provision of the special pins —40— at desired points for enabling fastening of scraper bars —36— thereto, the pivot pins —40— at such points being of sufficient length to pass through the links.

It will be seen that an endless conveyer member constructed in accordance with the present invention may be readily assembled and cheaply and easily manufactured, the parts being of comparatively light weight without sacrificing durability.

It is believed that the construction and utility of the present invention will be readily understood and the advantages thereof appreciated by those skilled in the art.

Minor changes may be made without departing from the spirit and scope of the invention as claimed.

What I claim as new and desire to secure by Letters Patent is:—

1. In an endless member of a chain and scraper conveyer, the combination with the usual pair of endless chains including inner and outer links, special pivot pins forming part of said chains at intervals and including inwardly projecting studs, and a scraper bar having its ends telescopically receiving adjacent pairs of said studs.

2. In an endless chain and scraper conveyer member, pairs of opposed link pivot pins having inwardly projecting studs, and a scraper bar telescopically receiving said studs in the ends thereof.

3. In an endless chain and scraper conveyer member, pairs of opposed link pivot pins having inwardly projecting studs, and a scraper bar having ears at the ends thereof telescopically receiving said studs.

4. In an endless chain and scraper conveyer member, pairs of opposed link pivot pins having inwardly projecting studs, and a scraper bar having ears at the ends thereof telescopically receiving said studs, said scraper bar being of substantially inverted V-shape in cross section with one leg vertical and the other inclined.

5. In an endless member of a chain and scraper conveyer, a pair of chains provided at intervals with pairs of inwardly projecting studs, and scraper bars having their ends telescopically receiving adjacent pairs of said studs.

In testimony whereof I hereunto affix my signature.

JOSEPH F. JOY.